United States Patent
Kotake

(10) Patent No.: US 9,360,856 B2
(45) Date of Patent: Jun. 7, 2016

(54) MACHINE TOOL CONTROL DEVICE

(75) Inventor: Kyota Kotake, Saitama (JP)

(73) Assignees: Citizen Holdings Co., Ltd., Nagano (JP); Citizen Machinery Co., Ltd., Nagano (JP)

( * ) Notice: Subject to any disclaimer, the term of this patent is extended or adjusted under 35 U.S.C. 154(b) by 370 days.

(21) Appl. No.: 14/131,766

(22) PCT Filed: Jul. 12, 2012

(86) PCT No.: PCT/JP2012/067777
§ 371 (c)(1),
(2), (4) Date: Jan. 9, 2014

(87) PCT Pub. No.: WO2013/015124
PCT Pub. Date: Jan. 31, 2013

(65) Prior Publication Data
US 2014/0156056 A1   Jun. 5, 2014

(30) Foreign Application Priority Data
Jul. 27, 2011   (JP) .................................. 2011-164370

(51) Int. Cl.
*G05B 19/18* (2006.01)
*G05B 19/404* (2006.01)

(52) U.S. Cl.
CPC .............. *G05B 19/18* (2013.01); *G05B 19/404* (2013.01); *G05B 2219/36056* (2013.01); *G05B 2219/49219* (2013.01)

(58) Field of Classification Search
CPC ............ G05B 2219/36056; G05B 2219/49219
See application file for complete search history.

(56) References Cited

U.S. PATENT DOCUMENTS

| | | | |
|---|---|---|---|
| 6,606,535 B1 | 8/2003 | Hamamura et al. | |
| 2006/0089745 A1* | 4/2006 | Suzuki | G05B 19/404 700/176 |
| 2009/0007082 A1 | 1/2009 | Nebel | |
| 2013/0004256 A1* | 1/2013 | Wu | B23Q 15/18 409/80 |
| 2013/0211598 A1* | 8/2013 | Fujii | G05B 19/404 700/275 |

FOREIGN PATENT DOCUMENTS

| | | |
|---|---|---|
| EP | 0555796 | 8/1993 |
| JP | 10-143217 | 5/1998 |
| JP | 2002-341912 A | 11/2002 |

* cited by examiner

*Primary Examiner* — Ryan Jarrett
(74) *Attorney, Agent, or Firm* — Howson & Howson, LLP

(57) ABSTRACT

Provided is a machine tool control device which reduces a processing burden of calculating a thermal displacement amount, avoids decrease in processing speed, and increases accuracy of machining a workpiece.

A machine tool control device (100) includes a sequential analysis control unit (110), an advance analysis control unit (120), a correction value calculation unit (130), a change amount calculation unit (140), and a mode switching unit (150), and operates a machine tool (M) by executing a machining program that is corrected on the basis of a thermal displacement amount occurring on components constituting the machine tool (M) to enable highly accurate machining of a workpiece (W).

4 Claims, 5 Drawing Sheets

(a)

THERMAL DISPLACEMENT AMOUNT AND CORRECTION VALUE
/WORKPIECE DIMENSIONS (b)

TIMING CHART OF MODE SWITCHING

MACHINE TOOL CONTROL DEVICE

TECHNICAL FIELD

The present invention relates to a machine tool control device that controls a machine tool such as an NC automatic lathe.

BACKGROUND ART

One of the correction amounts that are sequentially calculated in a conventional machine tool control device while executing a machining program is a correction amount for correcting a thermal displacement amount of a machine tool. For example, there is a machine tool control device that sequentially calculates and uses a thermal displacement amount as a correction value until a saturated thermal displacement amount is reached and uses the saturated thermal displacement amount as a correction value once the saturated thermal displacement amount has been reached (see Patent Literature 1, for example).

There is also a numerical control device that includes sequential analysis control means for reading and executing a machining program for machining a workpiece one line at a time and advance analysis control means for preliminarily decoding the machining program in a lump and converting and executing the machining program in a predetermined form. The numerical control device controls an operation of a machine tool via the sequential analysis control means or the advance analysis control means (see Patent Literature 2, for example).

CITATION LIST

Patent Literature

Patent Literature 1: Japanese Patent Application Laid-Open No. H10-143217 (see Claims and FIGS. 1 to 3)
Patent Literature 2: Japanese Patent Application Laid-Open No. 2002-341912 (see Claims and FIGS. 1 to 3)

SUMMARY OF INVENTION

Technical Problem

The aforementioned machine tool control device has, however, a problem in that a saturated thermal displacement amount has to be measured or calculated in advance and it is not easy to correct thermal displacement.

The advance analysis control means can usually control an operation of a machine tool faster than the sequential analysis control means. When the thermal displacement needs be corrected, however, the advance analysis control means has to decode and convert a machining program and create executable data on the basis of a correction value for the thermal displacement (thermal displacement correction value) in each machining cycle of a workpiece, for example. Thus, there is a problem in that the advance analysis control means could cause a decrease in processing speed and the thermal displacement cannot be easily corrected while the advance analysis control means is in operation.

Thus, a technical problem addressed by the present invention, or an object of the present invention, is to provide a machine tool control device capable of correcting thermal displacement that occurs in a machine tool and avoiding a decrease in processing speed to increase accuracy of machining a workpiece.

Solution to Problem

According to a first aspect of the present invention, a machine tool control device includes: a sequential analysis control unit for reading and executing a machining program for machining a workpiece one line at a time; an advance analysis control unit for preliminarily decoding the machining program in a lump and converting and executing the machining program in a predetermined form; and a correction amount calculation unit for sequentially calculating a correction amount for executing the machining program. The machine tool control device executes the machining program on the basis of the correction amount calculated by the correction amount calculation unit and controls an operation of a machine tool. The machine tool control device further includes: a change amount calculation unit for sequentially calculating a change amount of the correction amount; and a mode switching unit for switching between the advance analysis control unit and the sequential analysis control unit. The mode switching unit is configured for activating the advance analysis control unit when the change amount is within a predetermined range and activating the sequential analysis control unit when the change amount is not within the predetermined range. The advance analysis control unit is configured for executing the conversion of the machining program on the basis of a correction amount whose change amount is within the predetermined range and not re-executing the conversion of the machining program while the advance analysis control unit is in operation.

According to a second aspect of the present invention, the correction amount calculation unit calculates a thermal displacement correction amount in accordance with thermal displacement of the machine tool.

According to a third aspect of the present invention, the mode switching unit is configured for switching between the advance analysis control unit and the sequential analysis control unit at the beginning of each machining cycle.

According to a fourth aspect of the present invention, the mode switching unit includes a sequential analysis continuous activation unit for activating the sequential analysis control unit for a predetermined sequential analysis executing period when switching from the advance analysis control unit to the sequential analysis control unit within a predetermined time period after switching from the sequential analysis control unit to the advance analysis control unit.

Advantageous Effects of Invention

The machine tool control device in accordance with the first aspect of the present invention can increase accuracy of machining a workpiece by switching between the advance analysis control unit and the sequential analysis control unit in accordance with a change amount of a correction amount without measuring or calculating a saturation value of a correction amount in advance. Also, the machine tool control device can reduce a machining time needed for machining a workpiece via the advance analysis control unit by avoiding re-conversion of a machining program while the advance analysis control unit is in operation.

In addition to the advantageous effects of the machine tool control device in accordance with the first aspect of the present invention, the machine tool control device in accordance with the second aspect of the present invention can easily correct a thermal displacement amount, control an operation of a machine tool, and machine a workpiece highly accurately without measuring or calculating a saturated thermal displacement amount in advance, because the correction amount calculation unit calculates a thermal displacement correction amount in accordance with thermal displacement of the machine tool.

In addition to the advantageous effects of the machine tool control device in accordance with the first or second aspect of the present invention, the machine tool control device in accordance with the third aspect of the present invention can control a machine tool in a fast and highly-accurate manner to machine a workpiece highly accurately, because the mode switching unit is configured for switching between the advance analysis control unit and the sequential analysis control unit at the beginning of each machining cycle.

In addition to the advantageous effects of the machine tool control device in accordance with any one of the first to third aspects of the present invention, the machine tool control device in accordance with the fourth aspect of the present invention can further reduce the machining time of a workpiece by avoiding frequent switching between the sequential analysis control unit and the advance analysis control unit and thus preventing frequent conversion of a machining program.

DESCRIPTION OF EMBODIMENTS

Figure 1:
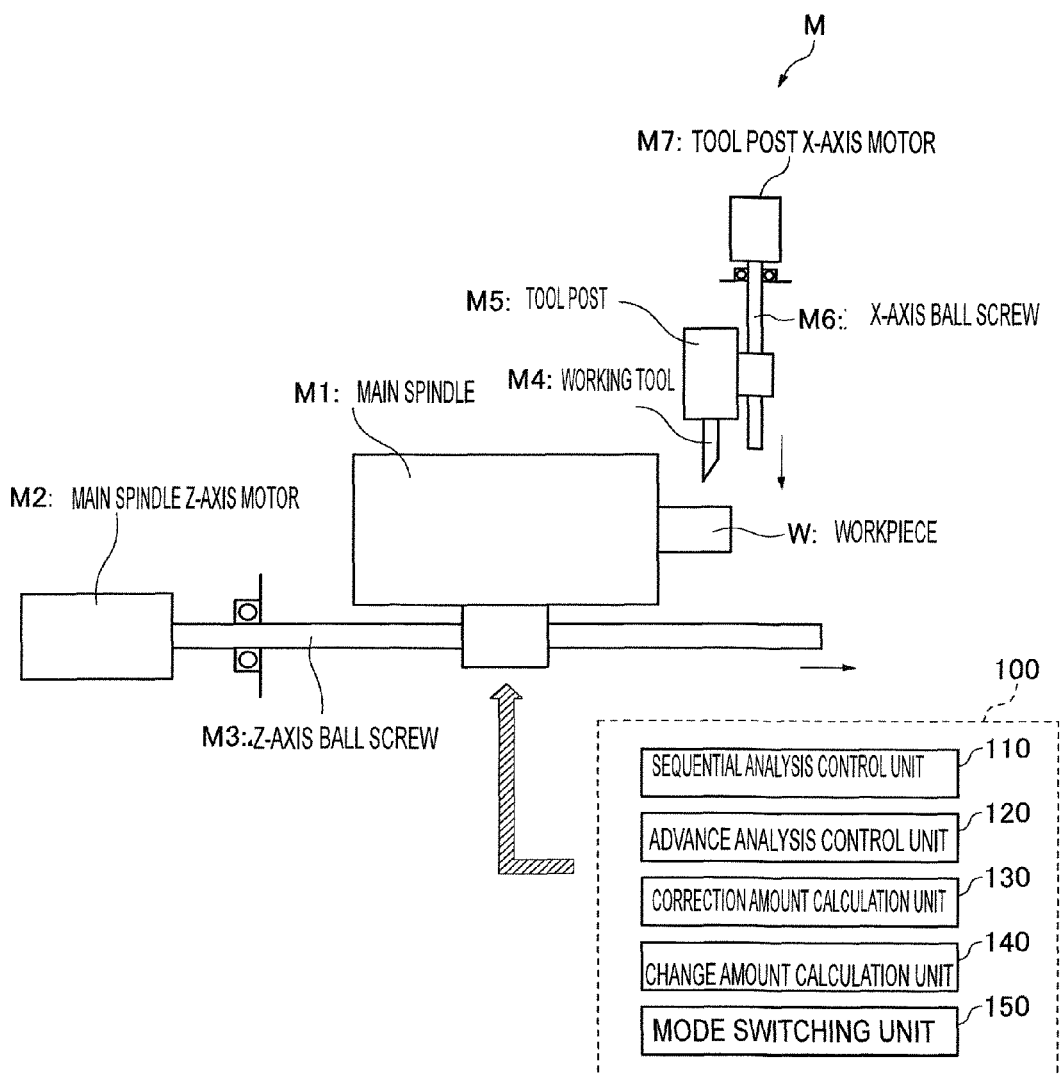
FIG. 1 is a block diagram illustrating a configuration of a machine tool control device as an embodiment of the present invention.

A machine tool control device 100 as one embodiment of the present invention will now be described. As shown in FIG. 1, the machine tool control device 100 includes a sequential analysis control unit 110, an advance analysis control unit 120, a correction amount calculation unit 130, a change amount calculation unit 140, and a mode switching unit 150, and controls a machine tool M. The machine tool M is supposed to be a machine tool that continuously machines a plurality of workpieces, such as an automatic lathe that machines a bar, and includes a main spindle M1, a main spindle Z-axis motor M2, a Z-axis ball screw M3, a working tool M4, a tool post M5, an X-axis ball screw M6, and a tool post X-axis motor M7.

On the basis of a pre-stored machining program, the machine tool control device 100 controls rotation of the main spindle Z-axis motor M2 for moving the main spindle M1 along the Z-axis ball screw M3 in a Z-axis direction, and controls rotation of the tool post X-axis motor M7 for moving the tool post M5 along the X-axis ball screw M6 in an X-axis direction. This enables the machine tool M to machine a workpiece W.

When the machine tool M machines the workpiece W, heat is usually generated by the rotation of the motors and the friction of the ball screws, for example. The heat causes elongation of the ball screws, for example, and that leads to a machining error (thermal displacement). To address this problem, the machine tool control device 100 is configured such that the correction amount calculation unit 130 calculates a thermal displacement correction amount as a correction value for correcting the thermal displacement and the change amount calculation unit 140 calculates a change amount of the correction value (correction amount).

Figure 2:
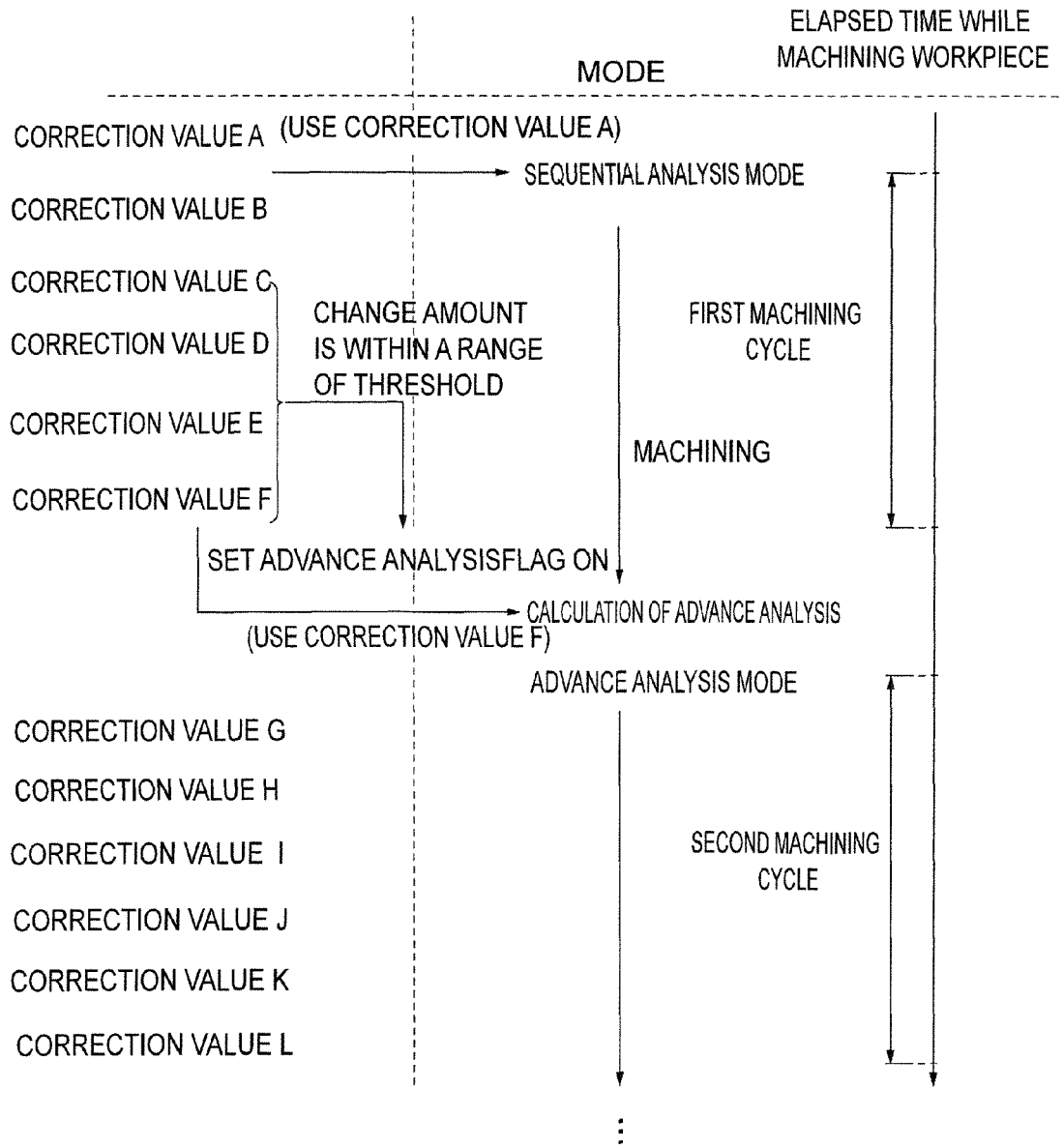
FIG. 2 is a table illustrating a machining program and analysis modes of a machine tool along a time axis.

As shown in FIG. 2, the correction amount calculation unit 130 sequentially calculates a correction value at a certain interval regardless of machining cycles of the workpiece W. The correction value is stored in a memory such as a register (not shown). The correction value is calculated based on the temperature and amount of thermal displacement in the machine tool, for example. A method of calculating the correction value is well-known and the detailed description thereof is thus omitted.

Figure 3:
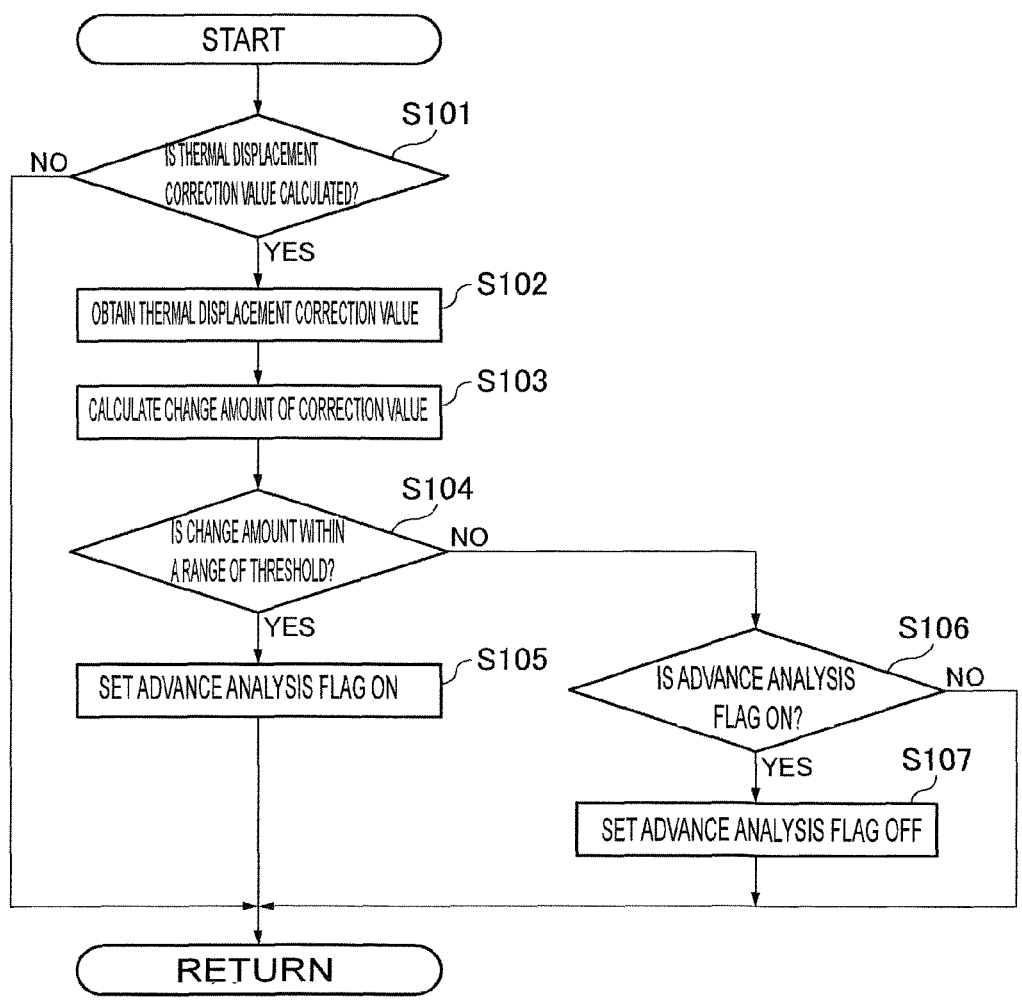
FIG. 3 is a flow chart illustrating a control flow of a machine tool control device as an embodiment of the present invention.

As shown in FIG. 3, the change amount calculation unit 140 determines whether a correction value is calculated by the correction amount calculation unit (step S110), obtains the correction value if it is calculated (step S102), and calculates a change amount on the basis of the obtained correction value (step S103). The change amount can be calculated by using the difference between successively calculated correction amounts or an average movement, for example.

The change amount calculation unit 140 then determines whether the change amount is within a predetermined range of threshold (step S104), and sets an advance analysis flag if the change amount is within the predetermined range (step S105). If the change amount is not within the predetermined range in step S104, it is determined whether the advance analysis flag is set (step S106). If the advance analysis flag is not set, the process returns to the start. If the advance analysis flag is set, the advance analysis flag is reset and the process returns to the start.

Accordingly, the change amount of the correction value is sequentially calculated on the basis of the correction value, and the advance analysis flag is set or reset on the basis of the change amount. Because the correction value is output regardless of machining cycles of the workpiece W, the advance analysis flag is also set or reset regardless of machining cycles of the workpiece W.

The machine tool control device 100 has a sequential analysis mode and an advance analysis mode. In the sequential analysis mode, the sequential analysis control unit (sequential analysis control means) 110 reads and executes a machining program one line at a time and controls each of the motors. In the advance analysis mode, the advance analysis control unit (advance analysis control means) 120 preliminarily decodes the machining program in a lump, converts the program in a predetermined form, and executes the converted program to control each of the motors. The sequential analysis mode and the advance analysis mode are switched and alternately set by the mode switching unit 150. The machine tool control device 100 controls machining of the workpiece W in either the sequential analysis mode or the advance analysis mode.

Figure 4:
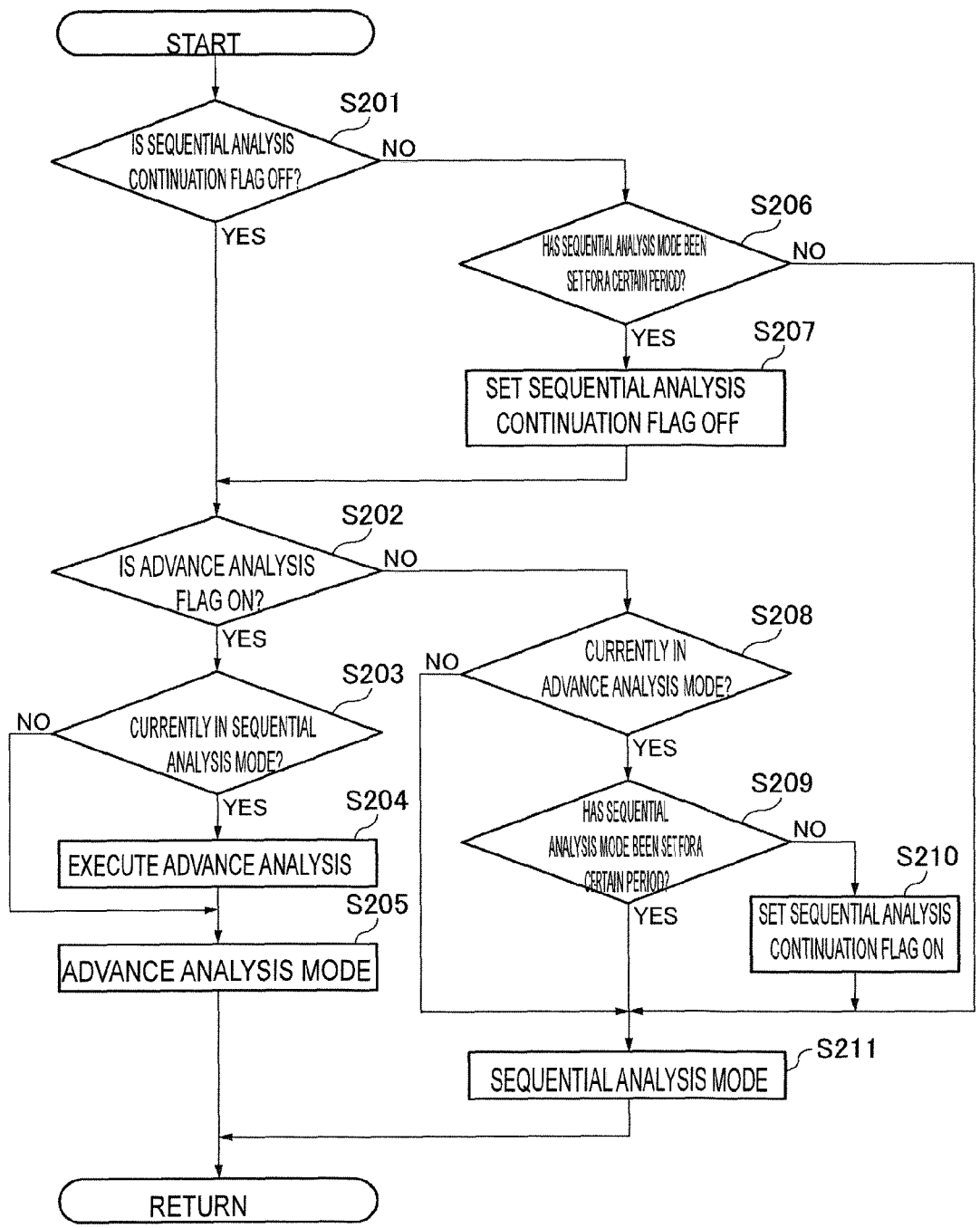
FIG. 4 is a flow chart illustrating a control flow of a machine tool control device as an embodiment of the present invention.

As shown in FIG. 4, the mode switching unit 150 determines whether a sequential analysis continuation flag, which is set in step S210 and reset in step S207, is set (step S201). If the sequential analysis continuation flag is not set, the mode switching unit 150 determines whether the advance analysis flag is set (step S202).

If the advance analysis flag is set, the mode switching unit 150 determines whether the sequential analysis mode is set (step S203). If the sequential analysis mode is set, the mode switching unit 150 makes the advance analysis control unit 120 execute advance analysis and perform calculation of the advance analysis (step S204), and sets the advance analysis mode (step S205). If the sequential analysis mode is not set in step S203, step S205 is directly carried out and the advance analysis mode continues without performing re-calculation of the advance analysis.

If the advance analysis flag is not set in step S202, it is determined whether the advance analysis mode is set (step S208). If the advance analysis mode is set, it is determined whether the advance analysis mode has been set for a certain period of time (step S209).

If the advance analysis mode has been set for the certain period of time, the sequential analysis mode is set (step S211). If the advance analysis mode has not been set for the certain period of time, the sequential analysis continuation flag is set (step S210), and the sequential analysis mode is set in step S211. If the advance analysis mode is not set in step S208, the sequential analysis mode is set in step S211 and the sequential analysis mode continues.

If the sequential analysis continuation flag is set in step S201, it is determined whether the sequential analysis mode has been set for a certain period of time (step S206). If the sequential analysis mode has been set for the certain period of time, the sequential analysis continuation flag for continuing the sequential analysis mode is reset (step S207), and step S202 is executed. If it is determined in step S206 that the sequential analysis mode has not been set for the certain period of time, step S211 is executed. The mode switching unit 150 repeatedly executes steps S201 to S211 at the end of each machining cycle of the workpiece W until the machine tool M completes machining of the workpiece W.

On the basis of the above described operation of the mode switching unit 150, the machine tool control device 100 sets the advance analysis mode when the advance analysis flag is set by the change amount calculation unit 140 and sets the sequential analysis mode when the advance analysis flag is not set at the end of each machining cycle of the workpiece W.

If the advance analysis mode is switched to the sequential analysis mode within a predetermined certain period of time, however, the sequential analysis mode continues for a predetermined certain sequential analysis execution period regardless of the setting of the advance analysis flag. Steps S201, S206, and S207 constitute a sequential analysis continuous activation unit for continuously activating the sequential analysis mode for the sequential analysis execution period.

When the machine tool control device 100 is in the sequential analysis mode, the sequential analysis control unit 110 executes a machining program one line at a time while making correction on the basis of a correction value at the beginning of a machining cycle of the workpiece W (such as a correction value A in FIG. 2). This enables to correct thermal displacement and the machine tool M can machine the workpiece W highly accurately.

When the machine tool control device 100 is in the advance analysis mode, the machine tool M can machine the workpiece W faster than when the machine tool control device 100 is in the sequential analysis mode, due to the program converted by the advance analysis control unit 120. The thermal displacement is corrected and highly accurate machining of the workpiece W is maintained in the advance analysis mode because the advance analysis control unit 120 converts the machining program on the basis of the latest correction value whose change amount is within the range of threshold (such as a correction value F in FIG. 2). The correction value used by the advance analysis control unit 120 for converting the machining program may be any value other than the above-described latest value, as long as the change amount of the correction value is within the range of threshold. For example, the correction value may be the first correction value whose change amount is within the range of threshold (such as a correction value C in FIG. 2) or an average of correction values whose change amounts are within the range of threshold.

Figure 5:
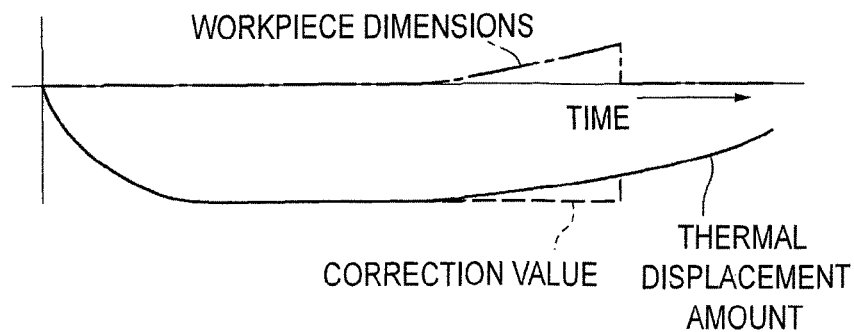
FIG. 5 includes a graph illustrating chronological change of a thermal displacement amount, workpiece dimensions, and a correction value and a timing chart of switching analysis modes.
Figure 5:
Figure 5:

When the advance analysis mode continues, however, the machine tool control device 100 continuously uses the program initially converted by the advance analysis control unit 120. Thus, as shown in FIG. 5, if the amount of the thermal displacement increases with respect to the correction value used by the advance analysis control unit 120 for converting the machining program and the change amount of a sequentially calculated correction value becomes out of the range of threshold, the accuracy of machining the workpiece W decreases and a machining error increases.

To address this issue, the calculation of a correction value by the correction amount calculation unit 130, the calculation of the change amount by the change amount calculation unit 140, and the setting/resetting of the advance analysis flag are continuously executed even after the advance analysis mode is set. Thus, as shown in FIG. 5(b), the machine tool control device 100 reverts to the sequential analysis mode when the change amount of a correction value, which was once within the range of threshold, becomes out of the range of threshold even after the advance analysis mode is set. The machine tool control device 100 can thus increase the accuracy of machining the workpiece W in accordance with the thermal displacement amount under the sequential analysis mode that is based on the latest correction amount This enables the machine tool M to maintain the highly accurate machining of the workpiece W. It is thus possible to increase the processing speed of machining the workpiece W by setting the machine tool control device 100 to the advance analysis mode and executing advance analysis, and to keep the accuracy of machining the workpiece W by setting the machine tool control device 100 back to the sequential analysis mode as need arises, without measuring or calculating a saturated thermal displacement amount in advance. The range of threshold is thus set as a machining error range that is acceptable with respect to planned dimensions of a workpiece.

When the workpiece W is machined in the advance analysis mode, the processing speed increases by a certain percentage per machining cycle of the workpiece W in comparison with the sequential analysis mode. Thus, if a cycle time of one machining cycle in the sequential analysis mode is t and a percentage of increase per machining cycle is α%, then the processing time of the workpiece W can be reduce by α*t/100 per machining cycle. For example, if the processing speed increases 5% per machining cycle of the workpiece W in the advance analysis mode, then the reduction of processing time per machining cycle is 0.05 t.

On the other hand, when the workpiece W is machined in the advance analysis mode, the advance analysis needs to be executed by the advance analysis control unit 120 before machining the workpiece W. A calculation time needed for executing the advance analysis, T, can be balanced out by machining the workpiece W in the advance analysis mode for T/(reduction of processing time) cycles. If the advance analysis mode continues for more than T/(reduction of processing time) cycles, or more than t*T/(reduction of processing time)=T/0.05, the whole machining time can be reduced. For example, if the reduction of processing time is 0.05 t as described above, the whole machining time can be reduced by machining the workpiece W in the advance analysis mode for more than t*T/0.05 t=T/0.05.

If the machine tool control unit 100 switches from the advance analysis mode to the sequential analysis mode within t*T/(reduction of processing time) after switching from the sequential analysis mode to the advance analysis mode, however, the calculation time T that occurs when switching to the advance analysis mode cannot be balanced out. If the sequential analysis mode continues thereafter, the whole machining time will be rather longer.

It is guessed that the machine tool control unit 100 switches from the advance analysis mode to the sequential analysis mode within t*T/(reduction of processing time) because thermal displacement is unstable. Thus, the mode switching unit 150 sets the certain period of time used in step S209 as t*T/(reduction of processing time), such as T/0.05, and the sequential analysis continuous activation unit activates the sequential analysis mode for the sequential analysis execution period, regardless of the setting (on/off) of the advance analysis flag, when the machine tool control unit 100 switches from the advance analysis mode to the sequential analysis mode within t*T/(reduction of processing time).

This prevents frequent switching between the sequential analysis mode and the advance analysis mode and restricts the increase in the machining time. The sequential analysis execution period may be any time period within which thermal displacement is expected to be stabilized, such as twice as long as t*T/(reduction of processing time).

REFERENCE SIGNS LIST

100 Machine tool control device
110 Sequential analysis control unit
120 Advance analysis control unit
130 Correction amount calculation unit
140 Change amount calculation unit
150 Mode switching unit
M Machine tool
M1 Main spindle
M2 Main spindle Z-axis motor
M3 Z-axis ball screw
M4 Working tool
M5 Tool post
M6 X-axis ball screw
M7 Tool post X-axis motor
W Workpiece
FIG. 1
SEQUENTIAL ANALYSIS CONTROL UNIT
ADVANCE ANALYSIS CONTROL UNIT
CORRECTION AMOUNT CALCULATION UNIT
CHANGE AMOUNT CALCULATION UNIT
MODE SWITCHING UNIT
MAIN SPINDLE
MAIN SPINDLE Z-AXIS MOTOR
Z-AXIS BALL SCREW
WORKING TOOL
TOOL POST
X-AXIS BALL SCREW
TOOL POST X-AXIS MOTOR
WORKPIECE
FIG. 2
CORRECTION VALUE A
CORRECTION VALUE B
CORRECTION VALUE C
CORRECTION VALUE D
CORRECTION VALUE E
CORRECTION VALUE F
CORRECTION VALUE G
CORRECTION VALUE H
CORRECTION VALUE I
CORRECTION VALUE J
CORRECTION VALUE K
CORRECTION VALUE L
(USE CORRECTION VALUE A)
CHANGE AMOUNT IS WITHIN A RANGE OF THRESHOLD
SET ADVANCE ANALYSIS FLAG ON
(USE CORRECTION VALUE F)
MODE
SEQUENTIAL ANALYSIS MODE
MACHINING
CALCULATION OF ADVANCE ANALYSIS
ADVANCE ANALYSIS MODE
ELAPSED TIME WHILE MACHINING WORKPIECE
FIRST MACHINING CYCLE
SECOND MACHINING CYCLE
FIG. 3
START
IS THERMAL DISPLACEMENT CORRECTION VALUE CALCULATED?
OBTAIN THERMAL DISPLACEMENT CORRECTION VALUE
CALCULATE CHANGE AMOUNT OF CORRECTION VALUE
IS CHANGE AMOUNT WITHIN A RANGE OF THRESHOLD?
SET ADVANCE ANALYSIS FLAG ON
IS ADVANCE ANALYSIS FLAG ON?
SET ADVANCE ANALYSIS FLAG OFF
RETURN
FIG. 4
START
IS SEQUENTIAL ANALYSIS CONTINUATION FLAG OFF?
IS ADVANCE ANALYSIS FLAG ON?
CURRENTLY IN SEQUENTIAL ANALYSIS MODE?
EXECUTE ADVANCE ANALYSIS
ADVANCE ANALYSIS MODE
HAS SEQUENTIAL ANALYSIS MODE BEEN SET FOR A CERTAIN PERIOD?

The invention claimed is:

1. A machine tool control device comprising:
a sequential analysis control unit for reading and executing a machining program for machining a workpiece one line at a time;
an advance analysis control unit for preliminarily decoding the machining program in a lump and converting and executing the machining program in a predetermined form; and a correction amount calculation unit for sequentially calculating a correction amount for executing the machining program, the machine tool control device being capable of executing the machining program on the basis of a correction amount calculated by the correction amount calculation unit and controlling an operation of a machine tool,
wherein the machine tool control device further comprises:
a change amount calculation unit for sequentially calculating a change amount of the correction amount; and
a mode switching unit for switching between the advance analysis control unit and the sequential analysis control unit, the mode switching unit being configured for activating the advance analysis control unit when the change amount is within a predetermined range and activating the sequential analysis control unit when the change amount is not within the predetermined range, the advance analysis control unit being configured for executing the conversion of the machining program on the basis of a correction amount whose change amount is within the predetermined range and not re-executing the conversion of the machining program while the advance analysis control unit is in operation.

2. The machine tool control device according to claim 1, wherein the correction amount calculation unit calculates a thermal displacement correction amount in accordance with thermal displacement in the machine tool.

3. The machine tool control device according to claim 1, wherein the mode switching unit is configured for switching between the advance analysis control unit and the sequential analysis control unit at the beginning of each machining cycle.

4. The machine tool control device according to claim 1, wherein the mode switching unit comprises a sequential analysis continuous activation unit for activating the sequential analysis control unit for a predetermined sequential analysis executing period when switching from the advance analysis control unit to the sequential analysis control unit within a predetermined time period after switching from the sequential analysis control unit to the advance analysis control unit.

\* \* \* \* \*